(12) United States Patent
Butron

(10) Patent No.: US 7,275,154 B2
(45) Date of Patent: Sep. 25, 2007

(54) METHOD OF OPTIMIZING THE PERFORMANCE OF A COMPUTER AND A MAIN NON-VOLATILE MEMORY UNIT OPTIMIZED USING SPECIFIC-USE SECTIONS

(76) Inventor: Manuel Fernando Mejias Butron, Goya No. 73-402, Col. Insurgentes Mixcoac, C.P. 03920 (MX)

( * ) Notice: Subject to any disclaimer, the term of this patent is extended or adjusted under 35 U.S.C. 154(b) by 358 days.

(21) Appl. No.: 10/496,808

(22) PCT Filed: Nov. 28, 2002

(86) PCT No.: PCT/MX02/00110

§ 371 (c)(1),
(2), (4) Date: May 27, 2004

(87) PCT Pub. No.: WO03/046714

PCT Pub. Date: Jun. 5, 2003

(65) Prior Publication Data

US 2005/0021501 A1   Jan. 27, 2005

(30) Foreign Application Priority Data

Nov. 30, 2001   (MX) .................. PA/a/2001/012371

(51) Int. Cl.
*G06F 9/00* (2006.01)
(52) U.S. Cl. ...................... 713/100; 717/151
(58) Field of Classification Search .............. 713/1; 717/175; 707/205; 711/165, 173
See application file for complete search history.

(56) References Cited

U.S. PATENT DOCUMENTS

| 4,435,752 | A | 3/1984 | Winkelman |
| 5,561,793 | A | 10/1996 | Bennett et al. |
| 6,108,780 | A | 8/2000 | Aoki |
| 6,131,192 | A | 10/2000 | Henry |
| 6,253,300 | B1 * | 6/2001 | Lawrence et al. ........... 711/173 |
| 6,735,678 | B2 * | 5/2004 | Noble et al. ................. 711/165 |

* cited by examiner

*Primary Examiner*—Thuan Du
(74) *Attorney, Agent, or Firm*—Birch, Stewart, Kolasch & Birch, LLP (57) ABSTRACT

A method is revealed to optimize the performance of a computer by establishing purpose-specific sections in its main non-volatile storage medium. This method creates a basic set of purpose-specific sections in order to store, separated at a physical level and at a logical level, basic elements associated to equipment operation such as operating system, dynamic files, applications and user related files; and, optionally, creates an additional set of purpose-specific sections to store other elements separated in like manner. A secondary method is also described to supplement the previous one, in order to quickly optimize an unlimited number of identical computers. In addition, the optimized main non-volatile storage medium that results from employing either of the previous methods is described. For users, owners and technicians of an optimized equipment, the use of this invention generates numerous advantages, including minimized file fragmentation; better defragmentation techniques, and improved operating speed.

15 Claims, 4 Drawing Sheets

METHOD OF OPTIMIZING THE PERFORMANCE OF A COMPUTER AND A MAIN NON-VOLATILE MEMORY UNIT OPTIMIZED USING SPECIFIC-USE SECTIONS

BACKGROUND OF THE INVENTION

Currently, computers have attained wide acceptance in various fields since such devices are exceptionally useful tools for executing a considerable variety of tasks. Scientific developments and the use of new technologies have contributed to this fact and, at the same time, have accelerated the arrival of newer and better computers into the market, at a lower production cost. Among the components That have evolved to The highest degree, Central Processing Units (CPUs) stand out, to cite an example; they arc increasingly becoming faster, smaller, and with more computing power than preceding generations. Other components that show a similar degree of technological refinement are devices used to provide computers with a main non-volatile storage mediums devices whose content remains even if the electrical energy supply is turned off, as is currently the case with hard disks or flash memory banks, which are becoming increasingly faster, more reliable, inexpensive, and with more capacity.

Nevertheless, in spite of much important technological advancement, such as the above-mentioned, all computers equipped with a main non-volatile storage medium, without exception, show evidence of an observable fact that originates from the same operating system that makes them useful. This phenomenon reveals itself as a gradual decrease in the performance of a computer, a reduction in its overall speed, so to speak, which becomes more significant with the day-to-day use of the equipment. As is to be expected, the user perceives the effects of this phenomenon because he/she must wait more time on every occasion for his/her tasks to be processed, even though the same computer performed better months before.

What is File Fragmentation?

In order to perceive the existence of this phenomenon, a good example to refer to is a typical "IBM® PC Compatible" computer, like the ones used daily in millions of offices, with a hard disk set up as its main non-volatile storage medium, as follows.

As the months go by, the user perceives a slow but sure increase in waiting times that reduce his/her productivity; little by little, his/her computer becomes less quick than when it was new. At the end of the first year, it is noticeable to the user that the equipment's performance has diminished to such an extreme that using it becomes unbearable. He/she might be able to wait for another year, but will eventually have to resort to professional help. Traditional techniques offer the following options to the user: (1) buy a newer, faster computer; (2) expand the existing hardware capacity, or up-grade it; (3) re-install the operating system and applications; (4) defragment the hard disk; or (5) a combination of the above. No matter what option is chosen, however, the effect on recovered performance will be temporary, short-term, because this is a recurrent phenomenon and the performance decrease will eventually reappear.

The referred phenomenon is known as "file fragmentation". It reveals itself in the main non-volatile storage medium of a computer. Its main cause is the operating system installed in the equipment, since this software is the one that manages the available non-volatile storage space. Its other cause is the traditional configuration of the storage device, which has not changed for more than twenty years as is the case of the "IBM® PC Compatible" platform, to mention an example.

How Does File Fragmentation Begin?

In order to describe with more detail how file fragmentation originates, another example will be useful. This time the focus will be on a personal computer, a new "IBM® PC Compatible" one, supplied with a hard disk as its main non-volatile storage medium, and with Microsoft® Windows 95® as its operating system, as is described as follows.

The hard disk in this computer requires a preliminary set-up in order to begin operation. The traditional techniques applied to date on hard disks have a distinctive feature: they create a "primary partition" that is configured as the "active partition", and that occupies all, if not most, of the disk's storage capacity. Next, the disk is "formatted". The actions of "partitioning" and "formatting" a hard disk are most important, since this is the only way to establish on its surface a structure composed of hundreds of thousands and even millions of tiny portions of equal size (usually of 4,096 bytes) called "clusters". The usefulness of clusters is apparent whenever the operating system reads files from the hard disk or writes files onto it.

Only after partitioning and formatting said main non-volatile storage medium, it is possible to achieve software installation, of operating system as well as applications, so that the computer is left ready to work.

It is important to mention here that, for over twenty years, manufacturers of this kind of computers have been using the same configuration for hard disks. The feature that makes this traditional configuration so particular is that four basic elements for machine operation co-exist all within only one space, having to themselves all, if not most, of such media's storage capacity. The above-mentioned four basic elements are: (1) files that are part of the operating system; (2) temporary work files and those frequently up-dated, used by the operating system as well as by applications, such as the virtual memory swap file, the temporary Internet files, and the logs for errors and for events; (3) files that are part of the applications installed; and (4) the user's files. Similarly, vital and non-vital elements for machine operation share the same storage space. This traditional configuration of a hard disk might appear to be just that: an old-fashioned and harmless way of making work a non-volatile storage medium inside a computer. As will become apparent later, however, several significant and adverse consequences to the owner of computing equipment arise from such technique.

After explaining the previous issue, it is now possible to discuss what happens when writing, reading or erasing a file on the hard disk. (1) When writing a file, the operating system first divides the data into chunks whose size (usually 4,096 bytes) is equal to that of a cluster. Then, it records such pieces onto the hard disk on the first available clusters that it finds, marking such clusters on a "map" as unavailable. (2) On the other hand, when reading a file is required, the operating system searches the "map" for those clusters that were used to store the file, gathering the bits of data and delivering them "in one piece" to whomever requested the reading. (3) Finally, in order to erase a file, the operating system again searches the "map" for those clusters related to the file, and marks them up as available, which causes the emergence of "gaps" that will be vacant on subsequent writings.

In order to understand how file fragmentation begins, it is necessary to bear in mind that writing, reading, and erasing clusters goes on dozens, hundreds, and even thousands of times during a working session. For this reason, the emergence of "gaps" is progressive, and subsequent writings fill them by placing the new bits of data in clusters that turn out to be disperse, non-contiguous; that are not together, so to speak, which fragments the files that are being written without fail. Consequently, with the normal use of the equipment, the contents of the hard disk become increasingly fragmented due to the writing and the erasing operations that the operating system continuously performs.

The result of the above is the afore-mentioned phenomenon of "fragmentation", sometimes called "hard disk fragmentation" when it takes place on such kind of media; albeit, in reality, as previously explained, what is fragmented is not the storage medium itself, but the files that it contains.

Why is the Operating System the Main Cause of Fragmentation?

The underlying reason that explains why the operating system participates as the main cause of such phenomenon is nothing less than the need to complete the task of writing files on the hard disk in the fastest possible manner, without taking time to find contiguous clusters that would allow a more efficient access to data on later readings.

The activities that induce an operating system to fragment the contents of the main non-volatile storage medium include, among others, the following. (1) Turning-on and turning-off the computer, (2) managing the virtual memory swap file, (3) opening and closing applications, (4) opening and closing data files, (5) sending files to the printer, (6) surfing on the Internet, and (7) sending and receiving e-mail. Being almost all of these tasks originated by user activities, at the end, they are completed by the operating system itself, within the computer core, in the form of reading, writing and erasing operations on said storage medium.

Why Does Fragmentation Decrease Computer Performance?

Fragmentation reduces computer performance because it progressively takes more time for the main non-volatile storage medium to complete those file reading, writing and erasing operations managed by the operating system. For example, in the particular case of a hard disk, the reading heads are required to achieve a vast number of moves in order to (1) read all disperse clusters that put together a fragmented file; or else, (2) to find those available clusters, that are usually also disperse, in order to write new files.

Taking into account that, during a working session, the operating system handles the reading, writing and erasing operations of hundreds, thousands and even millions of files in the non-volatile storage medium, it is clear why the performance of a computer gradually decays as long as its contents keep on fragmenting.

What is the Most Common Remedy for Fragmentation?

The traditional solution that solves this problem is a process known as "file defragmentation", sometimes called "hard disk defragmentation" when this kind of media is involved. Such process implies the relocation of disperse bits of data from all those fragmented files within the main non-volatile storage medium, in a way that all subsequent readings and writings carried out by the operating system are more efficient and take less time. The positive effects of defragmentation are always temporary, as long as the files do not fragment again, however.

Intrinsic Characteristics of the Traditional Defragmentation of Hard Disks

Since the hard disk is currently the most widely used main non-volatile storage medium on the market, it is necessary to examine certain inherent attributes of its traditional defragmentation process. Before that, however, it is fit to clarify the use of the term "traditional" in the above title: this is so because such process is based on the aforementioned traditional techniques of hard disk configuration.

Traditional Defragmentation of a Hard Disk, What is it About?

Each one of the fragmented files in a hard disk consists of a group of scattered portions. At a physical level, such portions written on the disk occupy a set of dispersed clusters due to the way the file was stored. Thus, in order to eliminate file fragmentation, a defragmenting tool uses a specific algorithm to create a complex plan of movements that it later uses to relocate the content of those scattered clusters. A typical way of defragmenting a hard disk is to reorganize its contents as follows: (1) each of the files "in one piece", all portions together and in sequential order; (2) all of the files located as one block, at the beginning of the disk; (3) free space located also in one block, but towards the end of the disk.

How Long Does it Take to Defragment a Hard Disk?

Due to the immense amount of work that such process implies, the traditional defragmentation of a hard disk takes anywhere from 1 to 8 hours (or more), depending on the storage capacity of the disk, its access time, its data transfer rate, the amount of files stored, and the defragmenting tool used. There is a published case, however, wherein the user had to stop such process because it had lasted for three days and three nights without completing more than 10% of progress.

Considering the above, it is clear why most people consider the process of traditional defragmentation of a hard disk as a notoriously tedious task, even though it is possible to improve the performance of a computer with it.

What Defragmenting Tools are Available on the Market?

There are many programs on the market that offer to defragment the contents of a hard disk. The latest versions of the MS-DOS® operating system already had a tool for such purpose. In like manner, the widespread Microsoft® Windows 95® operating system integrated a program that eliminated fragmentation in a simple way. A few years later, Microsoft® Windows 98® included a little more sophisticated defragmenter that had some inconveniences in its use.

Software manufacturers like, for example, Network Associates®, Symantec®, and Ontrack® (previously Mijenix®) developed, respectively, tools such as Nuts & Bolts®, Norton Utilities® and FixIt® in order to do more advanced defragmenting processes. On its own merits, Executive Software® developed Diskeeper®, an even more sophisticated tool that defragments in a continuous manner, non-stop and without user intervention, the hard disks of those computers with operating systems like Microsoft® Windows 95® and Microsoft® Windows 98® connected through a LAN to a server that has installed Microsoft® Windows NT®.

Who Benefits From Defragmenters?

Evidently, the benefits offered by existing defragmenters on the market are only for the user who employs them. In addition, if basic tools to defragment a hard disk are commonly unknown to the beginner, the sophisticated ones are even more so.

For that reason, while the inexperienced user perceives the damage but does not know about the cause or the solution, the advanced user, in contrast, does. The latter understands that performance degradation in a computer takes place because of hard disk fragmentation, and that the only way to solve such drawback, as tedious as it may appear, is to turn to programs that defragment the disk to a lesser or greater degree. In addition, this advanced user knows, much to his/her distress, that such process must be done once and again, on a regular basis, if the best possible computer performance is desired.

Defragmenting a Hard Disk, How Often Must it be Done?

In several articles published in specialized magazines, the authors really advise to defragment the hard disk of a computer on a regular basis. Some recommend once a month, at least. Others state the frequency depends on the kind of jobs the user carries out because such determines the fragmentation that will take place. There are others, however, that recommend defragmenting a hard disk every two weeks, and yet others who even claim that once a week is necessary, in order to minimize fragmentation and maintain computer performance in optimal state.

To top it all, the latest versions of defragmenters included in McAfee Utilities®, by Network Associates®, and Diskeeper®, by Executive Software®, establish the maximum suggested frequency that can be applied when defragmenting a hard disk configured by way of, under "the influence of", the so called traditional techniques. According to them, the best file defragmentation is the one that keeps going on as the user works, in a non-stop fashion, in a continuous way, without user intervention.

Existing Differences Between this Invention and the Traditional Techniques

Once the previous arguments have been explained, it is possible to examine with more detail those features that differentiate this invention from the so-called traditional techniques currently used. Above and beyond the defragmenting tools available on the market, which include (1) patents that protect algorithms to defragment non-volatile storage medium, there are also (2) patents that protect the way files are reorganized in a hard disk in order to reduce fragmentation recurrence. Besides that, there are also (3) patents that protect unique algorithms to defragment certain kind of files.

Traditional solutions against fragmentation known up-to-date, however, patented or not, (1) offer temporary remedies to a phenomenon of recurring nature; or else, offer partial solutions when compared against the present invention. (2) These solutions are based in the aforementioned traditional configuration of a non-volatile storage medium—a configuration that has at least twenty years of existence, in the same conditions, in the case of hard disks integrated within "IBM® PC compatible" computers. To top it all, (3) such solutions offer little benefit to the user when compared with this invention.

The present invention differs and moves away from the preceding since it applies the following adage: "The healthiest house is not the one that is cleaned the most, but the one soiled the least". This invention minimizes the effects of file fragmentation and, accordingly, it maintains the best possible performance of a computer, for considerably longer periods than what is achievable with the traditional techniques. Likewise, this invention uses an innovative configuration as its foundation, radically different from that currently offered by the manufacturers of computers, operating systems and software applications. This invention differs, as well, from the optimization techniques proposed by existing patents; and, it is the result of many years of research and successful tests carried out since the middle of 1999 on numerous computers, by real users.

An additional feature that sets this invention apart is that it provides the user with a proven set of benefits, unattainable simultaneously using the traditional techniques, available hardware and software tools, existing patents, or published propositions, whether such alternatives are applied alone or in combination. Among these benefits, the following stand out: (1) offer the best available performance of a computer, making it even better than when the equipment was new. (2) Provide a better security scheme for user's files which makes possible (a) to minimize the damages caused by virus attacks, Internet intrusions, and power failures; (b) to keep valuable information commonly lost with the traditional techniques of restoring, reinstalling and updating software; and (c) to create backup copies in an easier, faster, more complete and effective way. (3) Obtain a new optimized defragmentation process that becomes more effective and less tiresome than the traditional defragmentation. (4) Provide the user with savings of at least 70%, and, in some cases, more than 90%, in issues such as (a) the time taken away from the user when optimizing the performance of his/her computer by defragmenting the main non-volatile storage medium; (b) machine wear induced during such process; and (c) energy consumption derived from those activities. And finally, (5) offer the best cost-benefit ratio due to maximizing, on one side, the benefits obtained by the user; and, on the other, minimizing the investment needed, because this invention can be applied in new computers as well as used ones.

OBJECTIVES OF THE INVENTION

It is a goal of this invention to provide a method whose application results in the best possible performance of a computer.

It is another goal of this invention to make available a secondary method that supplements the function of the aforementioned first method in order to optimize in a minimal time dozens, hundreds or thousands of identical computers, that is to say, with matching hardware and software as well as configuration.

It is another goal of this invention to provide an optimized main non-volatile storage medium that includes a basic set of purpose-specific sections.

It is another goal of this invention to provide an optimized main non-volatile storage medium that optionally includes an additional set of purpose-specific sections.

It is another goal of this invention to offer the user an improved security scheme for his/her files, one that grants him/her more advantages than those offered by the traditional techniques.

It is another goal of this invention to bolster the maximum performance obtained in the equipment by means of the optimized defragmentation process applied to the main non-volatile storage medium.

It is another objective of this invention to make possible to the user savings in issues such as his/her time, machine wear, and energy consumption.

These and other goals of the invention will become apparent in the description of the preferred embodiment detailed further on.

SUMMARY OF THE INVENTION

This invention consists of three components: (1) a method for optimizing the performance of a computer by means of purpose-specific sections created in its main non-volatile storage medium. (2) A secondary method that supplements the preceding method in order to optimize the performance of an unlimited number of "replica" computers, in an accelerated manner, starting from the obtained optimization of a "master" computer. And, (3) a main non-volatile storage medium that, after being optimized by one of the preceding methods, exhibits a basic set of purpose-specific sections and, optionally, an additional set of purpose-specific sections.

The following two arguments set a context to explain the reasons by which this invention holds itself as an unprecedented technological innovation: (1) the possibility to establish sections in the main non-volatile storage medium of a computer, and (2) the published ideas on the subject. It is fit to clarify that, even though the said arguments will discuss the current problematical state of the personal computer industry, since it prevails worldwide, the following fact shall not be out of sight. This invention applies to any computing platform; to other kinds of devices, different from a computer, which use a main non-volatile storage medium; to different kinds of apparatus employed as main non-volatile storage mediums; and, to a variety of operating systems and applications.

The first argument examines for how long it has been possible to establish many sections, purpose-specific, or not, within the main non-volatile storage medium of a computer. In addition, it exposes that the exploitation of purpose-specific sections, such as those that result from applying the present invention in one or more computers, has been a technology ignored by the mass-consumer computing industry.

For some time, it has been possible to establish more than one section in the main non-volatile storage medium of a computer. A clear example is the first "IBM® PC compatible" computers that had a hard disk as their main non-volatile storage medium. By means of the "fdisk" command from Microsoft® MS-DOS®, the operating system installed in those computers, it was possible to establish various sections or "partitions" in the hard disk, letting the user employ such device as if it comprised many disk drive "volumes". In spite of that, however, the traditional configuration of the hard disk has been since then the scheme with only one partition, leaving the disk as a whole without sections.

Configuring the main non-volatile storage medium in this way has become more of a deeply rooted tradition than a technology of proven benefits. An example of this is the arrival of a questionable and atrocious trend in mass-consumer software design that is apparent in operating systems as well as applications, and that has dominated the market for the last twenty years.

One clear example of the previous is The existence of certain features in the Windows 95® and Windows 98® operating systems from Microsoft®, the most widely used worldwide. Such operating systems consider the hard disk as a whole without sections, since they prevent a painless optimization of a computer's performance by means of an effective separation, at a physical and at a logical level, of the basic elements for its function: operating system, dynamic files, applications and user's files. The particular case of dynamic files (those of temporary nature or those updated frequently, that become fragmented and thus contribute to fragmentation of other files) is proof of it, since it becomes impossible to separate them in another logical drive unit, in another partition, or in another folder, dissimilar from the original ones. Samples of such files and folders are the following: (1) some error logs and some incident logs located in paths such as "C:\", "C:\Windows", and "C:\Windows\Temp"; (2) files that keep record of application's frequency of use, located in the path "C:\Windows\Applog"; and (3) the temporary print jobs folder, located in "C:\Windwows\Spool". On its own merits, moving dynamic folders such as "Application Data", "Cookies", "Historial" (only in Spanish versions), "History", "Tasks", and "Temp", all of them located in the path "C:\Windows", is possible only when using a group of instructions that are not readily available to the public.

All along, since twenty years ago, the mass-consumer computing industry has exploited that particular configuration, that design criteria, and those techniques here known as "traditional", to such a degree that causes revulsion, in spite of its ill-fated and unavoidable consequences to the computer owner. Such expense is the inevitable, slow but sure, and recurrent detriment of equipment performance, as well as the potential loss of user's files. In order to dimension the deep roots of such techniques, it is enough to look at the next fact: ever since its arrival, more than 500 million personal computers have been sold worldwide using such traditional configuration, completely rejecting the multiple advantages of using purpose-specific sections in its main non-volatile storage medium. As inconceivable as it may appear, it has been a little more than two decades ever since hardware and software manufacturers ignore this possibility. They have maintained themselves at the margin of evolution, without taking notice and without exploring the benefits that derive from a technological advancement such as the one proposed by this invention, in spite of the ills affecting their customers, the computer users.

After examining the previous, it is possible to approach the second argument: the published ideas on the subject, and its contributions. Since many years ago, various authors documented the possibility and the advantages of creating "sections" in the main non-volatile storage medium of a computer, without examining thoroughly enough in an attempt to discover the advantageous results obtained by the creation of "purpose-specific sections", as this invention does. This might be the reason why such proposals do not have the commercial acceptance of the computing industry.

In the specific case of "IBM® PC compatible" computers, the authors contend, separately, that certain benefits appear by creating various partitions in a hard disk. An outline of such benefits is the following. (1) Files become better organized and there is a more efficient distribution of available space. (2) It is possible to maintain a variety of operating systems installed in a computer. (3) The start up time of an operating system is improved. (4) Fragmentation of the virtual memory swap file disappears when its located in an separate partition. (5) The loss of user files turns out to be minimal when a virus attack occurs or when software reinstallation is needed. All these ideas have been published in an isolated manner or, at least, in different dates and countries, which has limited its reach and acceptance among hardware and software manufacturers.

It is particularly important to mention two proposals whose authors motivate the creation of several partitions in the hard disk of "IBM® PC compatible" computers, especially if its storage capacity makes them fit in the category of "large hard drives". As a result, they argue in the first proposal, file fragmentation is reduced and consequently computer performance improves, among other benefits as those itemized above. Such proposals and the advantages they claim to offer, however, become limited and partial, in at least four important aspects, when compared side by side with this invention and with the outstanding set of benefits it brings forth. In order to show more details on this issue, the four aspects that make this invention different from said proposals will be examined as follows.

The first of these aspects is that said proposals do not mention the advantages of an effective separation of elements nor do they explain how to achieve it. For example, they never advise to transfer those files and folders that, in accordance with the first component of this invention, must be stored in a section intended for dynamic files, as is the case of the folder for temporary Internet files and the logs for errors and for events whose relocation is possible. Nor do they advise to relocate files that must be stored, in accordance with said first component, in a partition destined for the user's files, as is the case of those files where the e-mail messages and address books reside.

The following conclusion draws from such omissions: the authors do not perceive that it is possible to achieve even better computer performance by effectively separating all feasible elements in their matching purpose-specific sections, in compliance with their nature. The purpose of such strategy-is to keep ordinary fragmentation positively isolated from sporadic fragmentation in order to minimize, not merely "to reduce", the hard disk's global fragmentation, as is explained later in the "Detailed Description of the Invention". Said strategy is of essential importance because it allows this invention to extend the optimal-performance state of a computer for a longer period of time than that offered by both the traditional techniques and the published proposals.

The second aspect is that the first proposal asserts, as one of the benefits a user obtains, the ease in making back-up copies of his/her files, thanks to the fact that they are stored in a partition intended solely for such files. The authors do not explain to the user, however, that in order to make said back-up copies truly effective, as well as easy, it is necessary (1) to configure, both operating system and applications, so that they recognize and employ such partition according to its defined purpose. In addition, it is necessary (2) to relocate other very important files for the user in said partition, such as those containing e-mail messages, address books, and favorite Web page lists. Should the user not make such adjustments then he/she would lose valuable information when restoring, reinstalling, and, from time to time, even when updating, operating system or applications.

Unlike that proposal, this invention offers the user "an improved security scheme for his/her files" as one of its goals. Such benefit is possible thanks to the fact that the first component recommends the effective separation of the user's files in a purpose-specific section exclusively for them. Therefore, the back-up copies made in a computer that has been optimized by the present invention are easier, faster, and more effective than what is achievable by using the traditional techniques or the published proposals.

A third aspect stems from the fact that the second proposal, in addition to not pointing out any substantial benefit to the user, does not clearly specify which elements will be separated. The authors, in the first place, encourage the installation of one or more operating systems in separate partitions; in other partition, software applications; in yet another, the virtual memory swap file; and in a different one, the user's files. It is therefore incoherent that they later suggest unifying the applications with the user's files in only one partition. Should a user do the latter, he/she would severely limit the benefits the first proposal tries to provide, for the reasons previously explained in the previously mentioned aspects.

The above leads to the next conclusions: they are isolated proposals, and there is insufficient research done by the authors of the second one to determine with full certainty that it is better to achieve an effective separation of elements, whereas the first component of this invention does.

There is yet a fourth aspect consisting of the fact that the authors of the referred proposals omit to suggest defragmenting the created partitions once the separation of elements, as they conceive it, is finished. This invention makes it possible to obtain an optimized defragmentation process, better than the traditional one, that (1) is finished faster, (2) is more accurate, (3) is more effective, (4) its benefits are longer-lasting, and, hence, (5) it is only necessary to do it every two, every four or every six months at the most. These five advantages are not achievable by the traditional techniques or by the published proposals. This fact shows that such proposals are limited, hasty, and that their authors have not done enough research to reveal that more and better results in computer performance are yet achievable by carrying out an optimized defragmentation process, as stated by the first component of this invention.

DESCRIPTION OF THE DRAWINGS

In order to facilitate the way in which the included features, objectives and aspects of this invention are understood and obtained, a graphic explanation may be had by reference to the embodiments depicted in the appended drawings. However, it is fit to clarify that said appended drawings give a picture of sample embodiments of this invention and are therefore not to be considered limiting of its scope, for this invention may admit other equally effective embodiments.

Other features, objectives and aspects of this invention will also become apparent to one of skill in this field who studies the drawings of the sample embodiments associated to the descriptions given below.

FIG. 1 shows a traditional configuration of a main non-volatile storage medium 11 in a computer. Basic elements related to equipment operation (operating system, dynamic files, applications, and user related files) are stored in storage area 12 along with other files.

FIG. 2 is a sample embodiment of a main non-volatile storage medium 21 optimized with four purpose-specific sections 22. Each one of the basic elements related to equipment operation (operating system, dynamic files, applications, and user related files), are stored in separate purpose-specific sections (PSS 1 to PSS 4). In this case, other files reside in the same PSS as user related files. Said basic elements are separated at a physical level (the location of files stored in a storage device) and at a logical level (the parameters configured in installed operating system and applications).

DETAILED DESCRIPTION OF THE INVENTION

Figure 1:
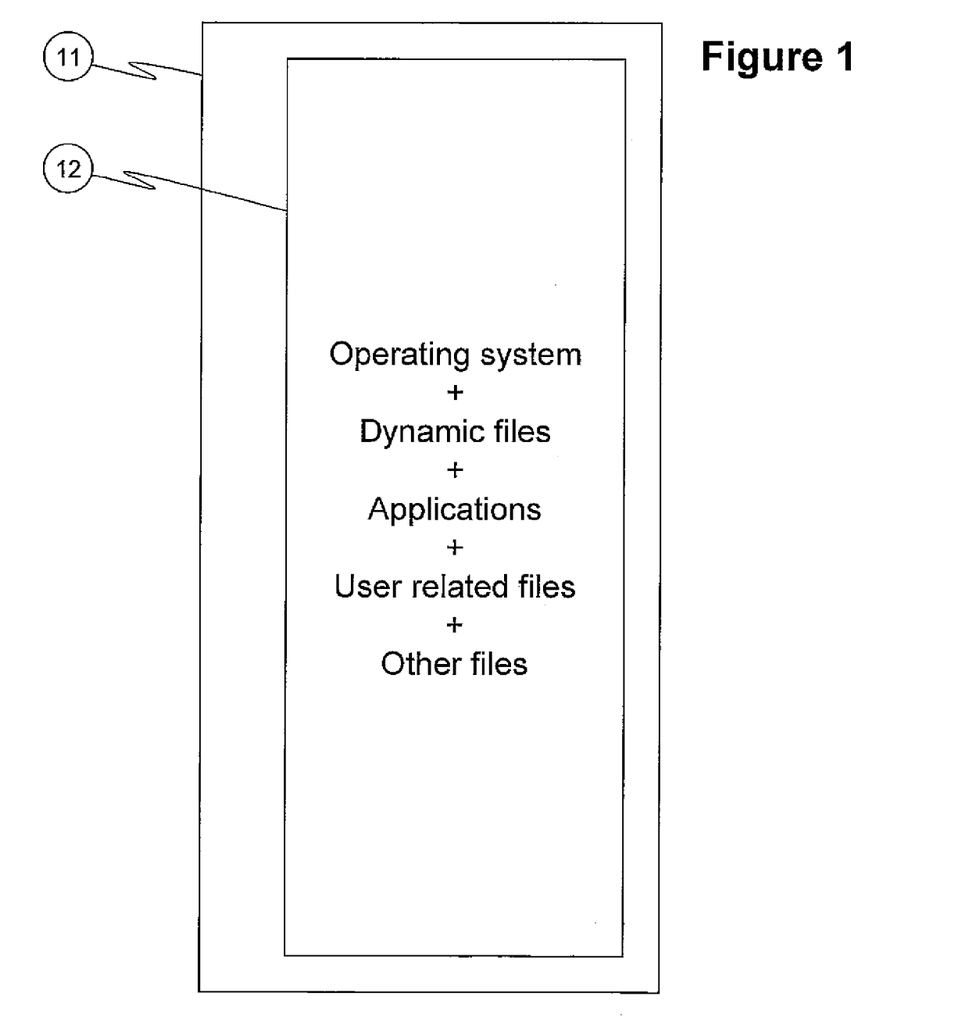
Figure 2:
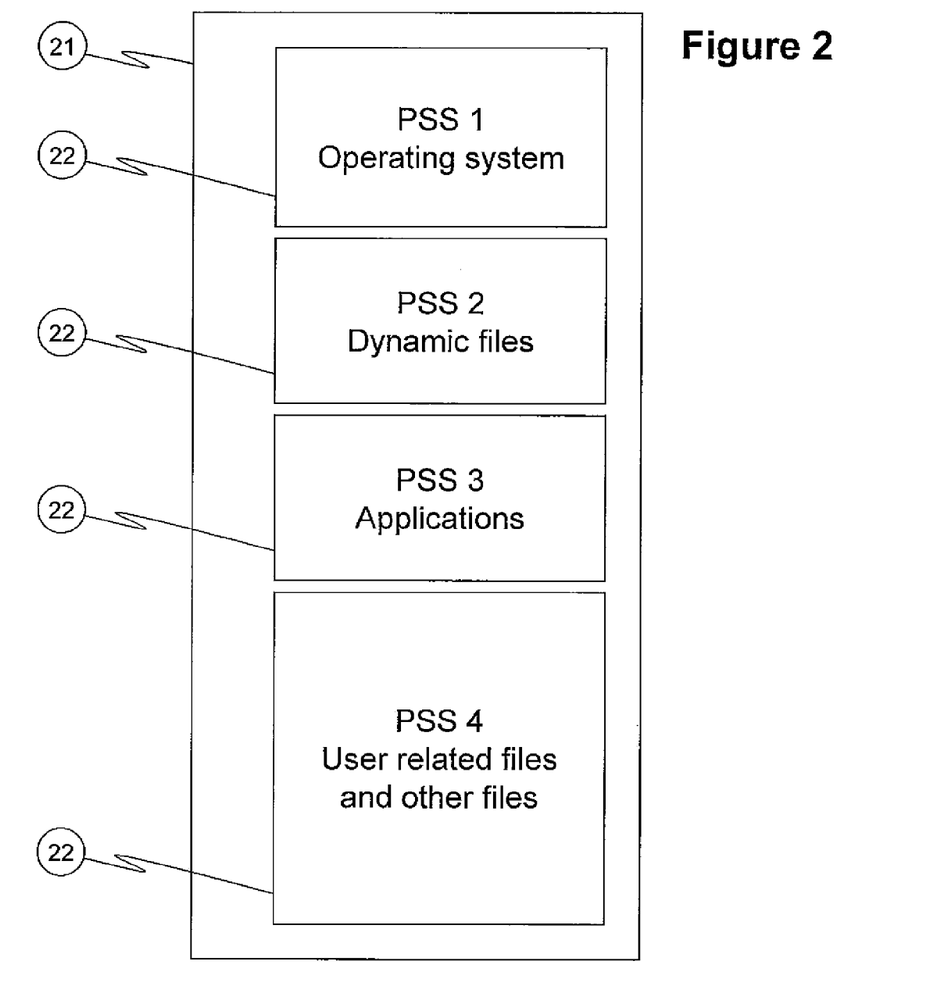
Figure 3:
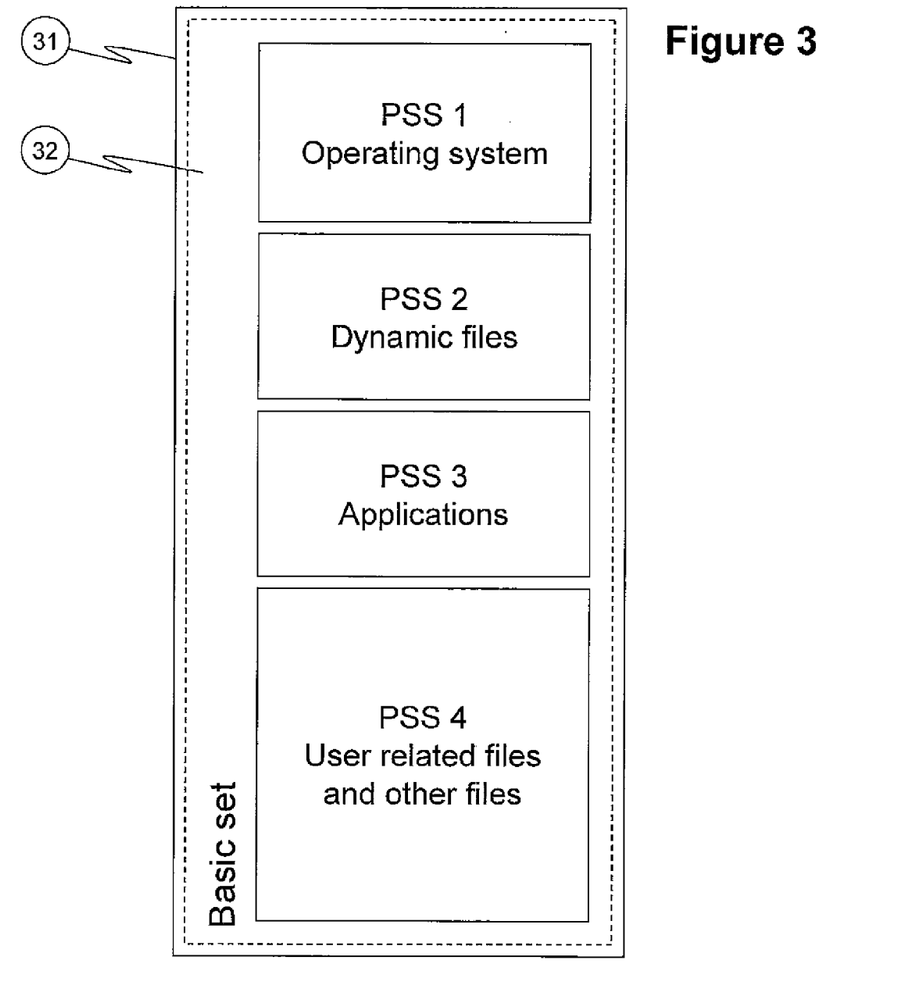
FIG. 3 is a sample embodiment of a main non-volatile storage medium 31 optimized with purpose-specific sections. A basic set of purpose-specific sections 32 (comprising PSS 1 to PSS 4) is enclosed by a dotted line. In this sample embodiment, other files reside in the same PSS as user related files.
Figure 4:
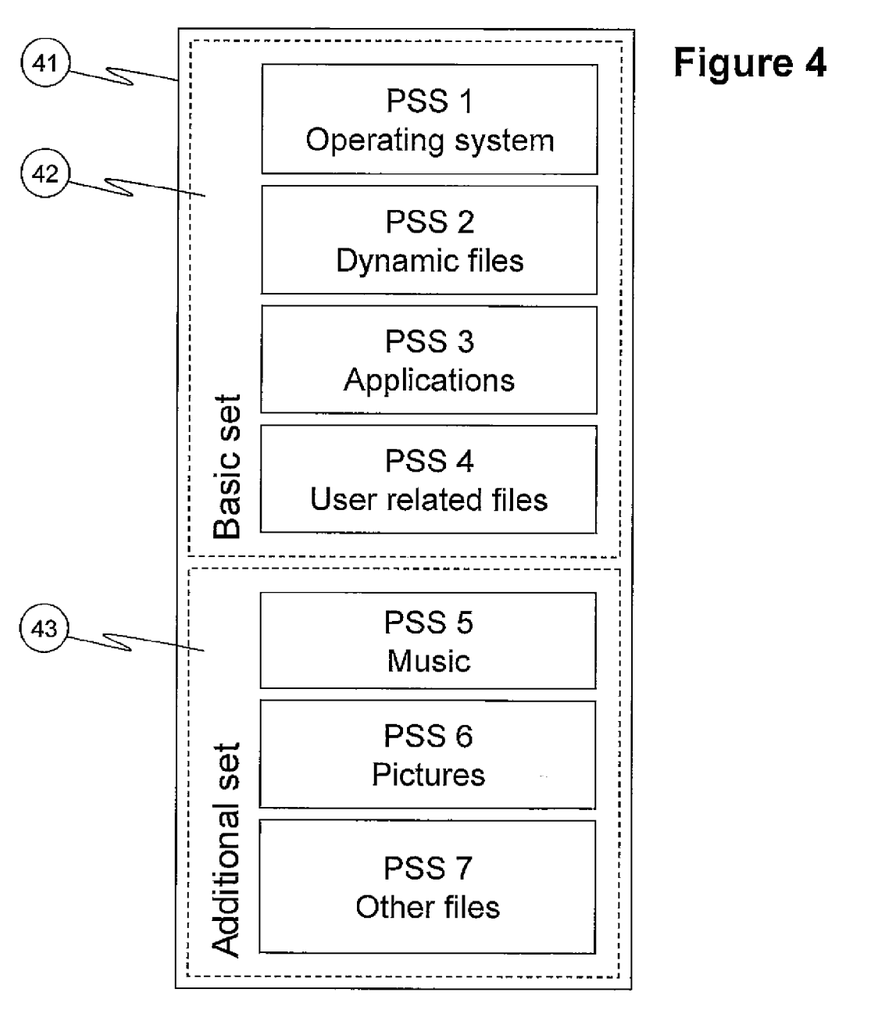
FIG. 4 is yet another sample embodiment of a main non-volatile storage medium 41 optimized with purpose-specific sections. A basic set of purpose-specific sections 42 (PSS 1 to PSS 4) is enclosed by the upper dotted line. In this sample embodiment, an additional set of purpose-specific sections 43 (PSS 5 to PSS 7) is enclosed by the lower dotted line.

This invention adopts a strategy in order to prevent vital and non-vital elements for computer operation from coexisting all at once in the same section. That is to say, computing equipment, or any other different device provided with a main non-volatile storage medium, that has been exposed to this invention contains an optimized main non-volatile storage medium that hosts said elements in compliance with three essential criteria: (1) The elements must be organized within one or more sets of purpose-specific sections. (2) They must be separate at a physical level, which is apparent by the position assigned to them within the storage medium. (3) They must also be separate at a logical level, which is apparent by the configurations established in the operating system as well as in applications, in a way that both elements recognize and take advantage of existing purpose-specific sections.

This new technology reduces the global fragmentation of said storage medium to a feasible minimum, thanks to the fact that ordinary fragmentation, which is produced by files that get fragmented with a greater rate of recurrence, remains isolated from sporadic fragmentation, which originates from those files read once and again without a change, unless its update is necessary. Consequently, this invention maintains the equipment's performance to its fullest potential.

Likewise, this technology offers a new type of file defragmentation: the "optimized defragmentation". This process turns out to be better than the traditional one due to the following facts. (1) It is carried out in less time, since it is easier and faster for the defragmenting tool and the equipment itself to defragment three or four small sections that are crucial for the computer's optimal performance than a sole large section where vital and non-vital elements for machine operation reside. Furthermore, this is a fact that has been consistently proven with equipment optimized by means of this invention. (2) It is more accurate, because it is possible to apply a distinct file placement scheme to each of the existing purpose-specific sections. (3) It is more effective, because such file placement scheme can be the most appropriate one, in compliance with the specific purpose of the section being defragmented. (4) Its benefits last for longer, because from the moment ordinary fragmentation is isolated from sporadic fragmentation, recurrence of this phenomenon is minimized. Finally, because of the previous facts, (5) it is only necessary to perform such process every two, every four or every six months at the most.

Once the previous has been explained, it is possible to discuss thoroughly each one of the three following components of this invention: (1) Method for optimizing the performance of a computer; (2) Method for quickly optimizing the performance of an unlimited number of computers; and (3) Main non-volatile storage medium optimized wit purpose-specific sections; all described as follows.

Method for Optimizing the Performance of a Computer

The first component of this invention is a method for optimizing the performance of a computer by means of purpose-specific sections created in its main non-volatile storage medium. This method comprises the five following stages: (1) Preparing the main non-volatile storage medium, (2) Installing and configuring the operating system, (3) Installing and configuring the applications, (4) Restoring the user's files, and (5) The optimized defragmentation of files.

$1^{st}$ STAGE. Preparing the Main Non-volatile Storage Medium

The first stage focuses on preparing the main non-volatile storage medium. It comprises the following three steps:

1) Making back-up copies.—The first step of this stage consists of making a back-up copy of those files useful to the user and those for the operation of hardware devices in the computer. This step may be skipped if a recent back-up copy is already available and if hardware device "drivers" are close at hand, ready to use;

2) Creating purpose-specific sections.—A second step consists of accomplishing all pertinent operations, depending on the case, so that a basic set of purpose-specific sections exists within the main non-volatile storage medium. This set is where the four vital elements for operating the optimized computer will reside. Therefore, the said basic set incorporates:

a) One section where only those files that are part of an operating system will be installed.
b) One section for dynamic files only. It will store temporary files or regularly modified files resulting from tasks inherent to the work of operating system and applications. Some examples include, but are not limited to, the followings the virtual memory swap file, the Internet cache, the logs for errors and the logs for events.
c) One section especially intended to enclose all those files that are part of applications.
d) One section exclusive for the user's files.

If more space is available in the main non-volatile storage medium, in case it is required, or if its creation seems to be convenient, an additional set of purpose-specific sections can be established. It is important to clarify that this set is optional because it will house non-vital elements for equipment operation. Some examples of the purpose-specific sections that the additional set could contain include, but are not limited to, the following:

a) One or more additional sections for user's files.
b) A write-buffer for the creation of compact discs.
c) One or more sections for files downloaded from Internet.
d) A quarantine-zone to keep virus infected files.
e) One or more sections for the digital edition of music or video files.
f) And an entire series of warehouses for large files such as databases, back-up copies, images, music, video, software updates, and a plethora of additional convenient functions; and 3) Consideration of cases with more than one operating system.—The third step of this stage focuses on dealing with cases in which more than one installed operating system is required. In this sense, it is important to keep in mind that each additional operating system (1) will have its corresponding basic set of purpose-specific sections, (2) will be installed in its own section within said basic set, (3) will be a "neighbor" of the dynamic files, the applications, and the user's files with which it is compatible, but (4) all of them will be separate at a physical level and at a logical level; besides, (5) it is possible for it to have its own additional set in which it can store, also separated at a physical level and at a logical level, non-vital elements for equipment operation that are compatible with the additional operating system. For these reasons, it is necessary to repeat the previous step as many times as operating systems are required or permitted by the computing platform of the equipment being optimized.

2$^{nd}$ STAGE. Installing and Configuring the Operating System

The second stage comprises installing and configuring the operating system. It encompasses the following steps:

1) Installing the operating system.—The first step of this stage consists of installing the operating system in the purpose-specific section that corresponds to it. If the program conducting the installation allows setting the location of one or more of the basic elements for computer operation, operating system, dynamic files, applications, and user's files, then it is of crucial importance to select the pertinent options, in such a way that this configuration is permanently set and such elements are deposited in their corresponding purpose-specific sections, in accordance with their nature, from the moment they are installed. An example of this is the Microsoft® Windows 95® operating system which, during its installation, it allows to choose where to store its files.

2) Installing and configuring device drivers.—A second step consists of installing and configuring the so-called "device drivers"; that is, those files that enable operation of the hardware devices included in a computer. Unless otherwise indicated by the drivers' manufacturer, installation and configuration of such elements takes place in this step.

It is necessary to mention two important issues concerning applications bundled together with device drivers: (1) whenever possible, their installation is left until the third stage. (2) If, while installing the drivers, however, one or more of these applications are automatically installed, then the pertinent options must be selected, in such a way that their files are stored in the corresponding section. An example of this is the Hewlett-Packard® CD-RW reader-writer device, model CD24, which, in addition to the drivers that make its operation possible, includes additional applications such as MusicMatch® Jukebox, ArcSoft® My Photo Center® and other utilities bundled by the manufacturer so that the user can exploit the functionality of such device.

3) Installing operating system supplements.—The third step of this stage consists of installing operating system enhancements; that is, the updates, patches, and add-ons that contribute to the optimal performance of the operating system and device drivers. Unless its creators provide precise instructions and reasons in favor of installing such supplements at a different time, installing such elements takes place in this step.

If the installer program allows setting the location of one or more of the basic elements for computer operation, operating system, dynamic files, applications, and user's files, then it is of vital importance to select the pertinent options in such a way that this configuration is permanently set and such elements are stored in their purpose-specific sections from the moment they are installed. An example that illustrates the previous is Microsoft® Internet Explorer, a program that keeps a strong relation with the Microsoft® operating systems and that, for such reason, is considered as an add-on that is installed in this step. During its installation, the referred application allows setting the location of its files.

4) Configuring the operating system and its add-ons.—A fourth step is focused on achieving the necessary configurations so that operating system and add-ons installed in the previous step recognize and use the purpose-specific sections that are useful for their operation, whether these sections are part of the basic set or the additional set. Such settings are necessary since the most popular operating systems in the market assume the main non-volatile storage medium as a whole without sections. For such reason, it is of the essence to adjust parameters and registries in use by the operating system and its add-ons to set where they will locate the following. (1) Dynamic files that can be repositioned in their corresponding section, such as the virtual memory swap file, the logs for errors and the logs for events, to mention a few examples. (2) Files that are part of installed applications. (3) Files generated by the user's work. And (4) the rest of the files and folders whose relocation onto the purpose-specific sections arranged in the additional set would be convenient, as long as its transfer is possible and plays a role in achieving the goals of this invention. In some cases, these configurations imply the transfer of files and folders into a new location, eliminating them from their original locations. So, unless the operating system or its add-ons automatically perform these operations when modifying their configuration, the transfer must be manually achieved.

5) Relocating applications detached from the operating system.—The fifth step of this stage focuses on relocating all those files that: (1) are detached from the operating system; (2) were stored by default in the section that relates to such operating system; (3) are part of those applications installed by the operating system, its add-ons, or the hardware device drivers; and (4) their transfer is possible to the corresponding purpose-specific sections. As nearly all of the existing software on the market takes for granted that the main non-volatile storage medium is a whole without sections, relocating these files is crucial in order to achieve the goals of this invention. This transfer requires, of course, pertinent adjustments in parameters and registries, where the previous location of such files is set, in such a way that the new location is established; and 6) Consideration of cases with more than one operating system.—The sixth and last step considers those situations where additional operating systems are required. In this sense, it is important to keep in mind that, for each additional operating system, there is a basic set of purpose-specific sections, and there may be an additional set. For this reason, it is critical to repeat the first previous steps of this stage for each additional operating system, using with each of them its own corresponding sets.

3$^{rd}$ STAGE. Installing and Configuring Applications

The third stage focuses on the processes of installing and configuring all required applications. Before going into detail, it is important to point out that the first three steps of this stage take into account only one application. For this reason, all applications deemed convenient for installation must be exposed to the first three steps as is later explained, one at a time, until they have all been installed. Once this has been said, it is possible to add that this stage consists of four steps:

1) Installing one application and its supplements.—The first step of this stage consists of installing one application in its corresponding purpose-specific section. In this step, it is important to include the installation of those updates, patches and add-ons that ensure optimal software performance, unless its creators justify and provide special instructions for installing such supplements at another time.

If the installer program offers a way to set the location of (1) one or more of the afore-mentioned vital elements for computer performance, operating system, dynamic files, applications, and user's files, or (2) any of the non-vital elements for machine operation, being used by applications and whose storage is convenient in the existing purpose-specific sections within the additional set, then it is of the essence to select the pertinent options in such a way that this configuration is permanently set and such elements are put in their corresponding purpose-specific sections from the moment they are installed. An example of this is Corel® Draw® 8, an application for desktop publishing which, during installation, when detecting the presence of more than one hard drive unit, allows setting the location of its temporary work files, that is, the files considered by this invention as dynamic files.

2) Configuring one application and its add-ons.—The second step concentrates on achieving the necessary configurations with the intention that said application and its add-ons recognize and employ those purpose-specific sections that are useful for their functioning, whether these sections are part of the basic set or the additional set. Nearly all of the software on the market assumes that the main non-volatile storage medium is a whole without sections, which makes said configurations inevitable. Thus, it is crucial to modify the parameters and registries used by said application, by its add-ons, and by the operating system to establish where they will locate the following: (1) Dynamic files that can be relocated in the corresponding section by their nature, as the temporary Internet files, the logs for errors and the logs for events, for instance. (2) Files that are part of applications, in case any of the related parameters were modified during the installation process of the application or its add-ons. (3) User's files and other useful items, such as those files containing e-mail messages, address books, and favorite Web page lists, for example. (4) Outstanding files and folders whose relocation is viable and suitable in the purpose-specific sections of the additional set, as long as its transfer plays a role in achieving the goals of this invention. In many cases, these configurations imply transferring files and folders to its new location, a process that includes removal from their original sites. Thus, unless the operating system or its add-ons automatically perform such operations when modifying its settings, the transfer must be performed manually.

3) Relocating files detached from the operating system.—The third step of this stage consists of relocating all those files that: (1) are detached from the operating system; (2) were stored by default in the section that relates to such operating system; (3) are part of the installed application or its add-ons; and (4) can be transferred to the corresponding purpose-specific sections. As nearly all of the existing software on the market takes for granted that the main non-volatile storage medium is a whole without sections, relocating these files is of the essence to achieve the goals of this invention. This transfer requires, of course, pertinent adjustments in parameters and registries, where the previous location of such files is set, in such a way that its new location is established; and 4) Consideration of cases with more than one operating system.—The fourth and last step considers situations where additional operating systems, with their matching applications, are required. In this sense, it is important to keep in mind that, for each additional operating system, a basic set of purpose-specific sections is present, and possibly an additional set. Thus, it is necessary to repeat the first previous steps of this same stage for the extra applications needed, using the corresponding sets according to the additional operating systems with which they are compatible.

$4^{th}$ STAGE. Restoring the User's Files

The fourth stage focuses on restoring the user's files. This is an optional stage only required if a back-up copy of the user's files was created during the first stage. It comprises the two following steps:

1) Restoring back-up copies.—The first step consists of restoring the user's files in their corresponding purpose-specific sections. It is important to point out that, when restoring said back-up copy, it is necessary to put those files useful to the user, such as the files containing e-mail messages, address books, and favorite Web page lists, in the new locations that were set in the previous stage. If needed, applicable additional configurations in the operating system and applications, in addition to all necessary data conversions in said files, must be performed in order for the user to employ in a normal way his/her information.

2) Consideration of cases with more than one operating system.—The second and last step considers those situations where more than one operating system with its own applications and user's files is required. Take into account that, for each additional operating system required, a basic set of purpose-specific sections exists, and perhaps an additional set too. Thus, the last step must be repeated using the sets that host the applications with which the user's files will be put to good use.

$5^{th}$ STAGE. The Optimized Defragmentation of Files

The last stage of this method consists of the optimized defragmentation of files in each of the purpose-specific sections that exist in the computer's main non-volatile storage medium, no matter if it is to the basic set or to the additional set they belong to; or the operating system with which they are compatible. As an essential bare minimum, the optimized defragmentation process must be carried out in those purpose-specific sections where the four previously mentioned vital elements for equipment performance, operating system, dynamic files, applications, and user's files, are stored.

When performing said optimized defragmentation process, it is essential to use the most appropriate file placement scheme based on the following factors: the installed operating system, the defragmenting tool used, and the specific purpose of the section being defragmented. In this way, it is possible to achieve an optimized defragmentation process, better than the traditional one, since (1) it is completed in less time, (2) it is more accurate, (3) more effective, (4) its benefits last longer, and (5) it is only necessary to perform it every two, every four or every six months at the most.

Method for Quickly Optimizing the Performance of an Number of Computers

The second component of this present invention consists of a secondary method that supplements the first component of this invention so that it is possible to quickly optintiize the performance of an unlimited number of "replica" computers from the optimization obtained in a "master" computer.

In order to explain the usefulness of the second component, it is important to emphasize that the first component, the previously mentioned method for optimizing the performance of a computer, was conceived to optimize the performance of one computer at a time. Massive applications at commercial or industrial levels, however, require a secondary method that makes it possible to swiftly optimize dozens, hundreds, or even thousands of identical computers, that is to say, identical in its hardware and software as well as in its configuration. Situations like these are typical, for example, to personnel who manage computing systems in a mid-size enterprise or a corporation, and to personnel in charge of mass production lines in a computer manufacturing plant. In scenarios like these, employing the secondary component is justified so that an unlimited number of machines are optimized in the fastest achievable manner. Using the first component in only one "master" computer in order to later duplicate its optimal state in the rest of the "replica" computers is a timesaving technique. To achieve such outcome, it is crucial to use, alone or in combination, tools such as software programs, hardware devices, and those disk drives and storage media that exist on the market for this purpose.

The second component of the invention comprises the three following stages:

1st STAGE. Optimizing the "Master" Computer

The first stage consists of choosing a "master" computer to then optimize it with the afore-mentioned first component, the method for optimizing the performance of a computer. The details of this first component have been previously explained and are thus omitted in this step.

2nd STAGE. Optimizing the "Replica" Computers

The second stage consists of using assorted tools, such as software programs, hardware devices, and storage media or disk drives, that exist on the market for this purpose, alone or in combination, so that the optimal state of the "master" computer is rapidly transferred to all of the "replica" computers. The result of this stage has to be an exact copy of the structure and contents of the "main non-volatile storage medium optimized with purpose-specific sections" of the "master" computer in the corresponding main non-volatile storage medium of all and each of the "replica" computers.

3rd STAGE. Final Adjustments in the Optimized Computers

The third and last stage is optional. It consists of configuring parameters in those machines that so require it in order to differentiate some from others under different circumstances. Some examples include, but are not limited to, the following: a unique user profile, different from that in other machines; a particular machine identification that makes it different from others in a local area network; and the TCP/IP protocol settings that would permit Internet access to users in a local area network.

Likewise, when the installation of additional software is required in the machines that will be used by specific groups of users, such installation must be carried out following the steps outlined in the third stage of the first component of the invention.

Main Non-volatile Storage Medium Optimized with Purpose-specific Sections

The third and last component of this invention is the main non-volatile storage medium optimized with purpose-specific sections That results after applying The "method for optimizing the performance of a computer", either by using such method in only one computer, as the first component explains, or in an unlimited number of computers, as the second component does.

Even though nowadays computer manufacturers use hard disks as the preferred device when providing a main non-volatile storage medium to a computer, it is important to clarify that nothing limits these as the only optimizable devices. For this reason, the third component at issue considers that any other storage medium, past, present and future; whose contents remain even if the energy supply is interrupted, as happens with flash memory, to mention an example, is optimizable.

After clarifying the previous matter, it is now possible to establish that the main non-volatile storage medium optimized with purpose-specific sections at issue has more than a few particularities. These can be grouped in the following three sections:

1) Attributes of the main non-volatile storage medium.—The first characteristic of this storage medium is the presence of one or more sets of purpose-specific sections. The most important one is the basic set, since the four basic elements for computer operation reside in it, separated at a physical level and at a logical level. In this way, the basic set at issue is comprised by:

a) One section where only those files that are part of an operating system are installed.

b) One section for dynamic files only. It will store files of temporary character or files modified on a regular basis that result from tasks inherent to the work of the operating system and applications. Some examples include, but are not limited to, the following: the virtual memory swap file, the Internet cache, the logs for errors and the logs for events.

c) One section mainly intended to hold those files that are part of applications.

d) One section exclusive for the user's files.

When more space is available in the main non-volatile storage medium, in case it is required, or if its creation appears to be suitable, an additional set of purpose-specific sections will also be present. It is important to clarify that this set is optional because in it will reside non-vital elements for equipment operation, separated at a physical level and at a logical level. Examples of the purpose-specific sections that the additional set could contain include, but are not limited to, the following:

a) One or more additional sections for user's files.

b) A write-buffer for the creation of compact discs.

c) One or more sections for files downloaded from Internet.

d) A quarantine-zone to keep virus infected files.

e) One or more sections for the digital edition of music or video files.

f) And an entire series of warehouses for large files such as databases, back-up copies, images, music, video, software updates, and a plethora of additional convenient functions.

It is possible to examine a second and a third additional feature in the optimized main non-volatile storage medium. Both of them can be perceived right after employing the first or the second component, and both stem from the optimized defragmentation that took place. One of them is that the fragmentation level of existing purpose-specific sections is zero. The other is that the file placement scheme used for each section is distinct, the most adequate in accordance with the specific purpose of each one.

It is important to consider a special case of a main non-volatile storage medium, like the one detailed before, which requires more than one operating system installed. In a storage medium with such feature, each additional operating system required (1) has its matching basic set of purpose-specific sections, (2) is installed in its own section within said basic set, (3) is a "neighbor" of the dynamic files, the applications, and the user's files with which it is compatible, but (4) all of them are separate at a physical level and at a logical level; besides, (5) it is possible for it to have its own additional set in which it can store, also separated at a physical level and at a logical level, non-vital elements for equipment operation that are compatible with such additional operating system.

After explaining the previous issue, it is now possible to add a final consideration-to this section. The sets of purpose-specific sections mentioned above constitute the main difference between a conventional main non-volatile storage medium and one that has been optimized by this invention.

2) Attributes of operating system and applications.—While traditional techniques destine all, if not most, of the available space in said storage medium to create one section alone, and to keep in it all vital and non-vital elements for equipment operation, this invention moves away from such guidelines by embracing a strategy to avoid that these elements coexist all at once within only one and the same section. That is, a main non-volatile storage medium optimized by the present invention hosts said elements in compliance with three fundamental criteria: (1) The elements must be organized within one or more sets of purpose-specific sections. (2) They must be separate at a physical level, by the position conferred to them within the storage medium. (3) And they must be separate at a logical level, by the configurations set in the operating system as well as in applications so that both elements recognize and make good use of existing purpose-specific sections in the basic set and also in the additional set.

The above-mentioned configurations constitute the foremost difference between elements such as the operating system and the applications installed and configured in a conventional main non-volatile storage medium and the same elements installed and configured in a storage medium that has been optimized by this invention; and 3) Attributes in equipment performance.—There are three attributes that relate the performance of a computer with its main non-volatile storage medium after the latter has been optimized by the present invention. The first of them is that, it is possible to reduce the global fragmentation of said medium to a feasible minimum thanks to vital and non-vital element separation, at a physical level as well as at a logical level, each one in its own purpose-specific section. This is because ordinary fragmentation, the one that is produced by regularly fragmented files, is well isolated from sporadic fragmentation, the one resulting from files read once and again without change, unless its update is necessary.

The second attribute is that the third component at issue, the main non-volatile storage medium optimized with purpose-specific sections, allows to obtain a new kind of file defragmentation: the "optimized defragmentation". This new process results better than the traditional one due to the following facts. (1) It is carried out in less time, since it is easier and faster for the defragmenting tools and the equipment itself to defragment three or four small sections crucial for the computer's optimal performance than a single large section where all vital and non-vital elements for machine operation would reside. (2) It is more accurate, because it is possible to apply a heterogeneous file placement scheme to each of the existing purpose-specific sections. (3) It is more effective, for the reason that such file placement scheme can be the most appropriate in accordance with the specific purpose of the section being defragmented. (4) Its benefits last for longer, since once ordinary fragmentation is isolated from sporadic fragmentation, recurrence of this phenomenon is minimized. Finally, due to the previous facts, (5) it is only necessary to do it every two, every four or every six months at the most.

A consequence deriving from the two previous attributes is that, as time goes by, the main non-volatile storage medium optimized with purpose-specific sections at issue does not become an obstacle, as frequently happens with non-optimized conventional media, but, thanks to its optimization, it is feasible to maintain equipment performance at its fullest potential.

The third and last characteristic of a main non-volatile storage medium optimized in this way is that its presence, within the computer that houses it, lets the equipment's owner get an exceptional set of benefits unique in its kind. Said benefits were explained in the last paragraph of the "Background of the Invention" section, and are thus omitted here. It is due to emphasize, however, that in a conventional main non-volatile storage medium, not yet optimized by this invention, it becomes impossible to concurrently get said benefits using the traditional techniques, hardware and software tools available on the market, existing patents, or published proposals related to the subject, whether such alternatives are applied alone or in combination.

The three attributes afore-mentioned in this section constitute the main difference between the performance of a computer possessing a conventional main non-volatile storage medium and one that incorporates a medium optimized by this invention.

PREFERRED EMBODIMENT OF THE INVENTION

Even though amid themselves they are entirely different products, though closely related, "IBM® PC compatible" computers possess something in common with operating systems such as Microsoft® Windows® 95 and Microsoft® Windows® 98: they are the computer products that have achieved the greatest penetration on the market. Such fact is true as nearly all of the personal computers currently in use fit into such platform and have installed one of these operating systems. For that reason, in order to explain real applications of this invention, the preferred embodiment described next will be carefully connected with this market fact.

This preferred embodiment is based in a hypothetical case involving the Second Edition of the Microsoft® Windows® 98 operating system, an "IBM® PC compatible" personal computer, and a hard disk with a storage capacity of 10.2 billion bytes as its main non-volatile storage medium. The following assumptions are also made:

a) It is a new computer with a "factory-installed" Microsoft® Windows® 98 Second Edition operating system.

b) Since it is new equipment, it does not contain users files.

c) It contains 64 MB of RAM, one hard disk with storage capacity of 10.2 billion bytes, an internal CD-RW, a multimedia device (detachable sound card) and external speakers.

d) It will have Internet access by means of an external modem.

e) It will use a set of applications for office work (word processor, spread sheet, etcetera), desktop publishing, Internet e-mail and Web page navigation.

f) It will use a printer and an image scanner connected to the computer through the parallel port.

g) All needed software is available either in floppy disks or in CD's. This includes the Microsoft® Windows® 98 Second Edition operating system; the hardware device "drivers"; the applications; and, of course, updates, patches and add-ons for operating system and applications.

Once the previous assumptions have been explained, it is possible to examine in detail the first component of this invention. In this way, it is only necessary to detail the steps related to this preferred embodiment, organizing them in accordance with the five previously explained stages: (1)

Preparing the main non-volatile storage medium, (2) Installing and configuring the operating system, (3) Installing and configuring the applications, (4) Restoring the user's files, and (5) The optimized defragmentation of files.

1$^{st}$ STAGE. Preparing the Main Non-volatile Storage Medium

Step 1. Making Back-Up Copies

The first step is skipped because this is a new computer and it is not necessary to make a back-up copy of neither the user's files nor the drivers, since the latter are available in disks.

Step 2. Creating Purpose-specific Sections

The second step consists of creating a basic set of purpose-specific sections that contains partitions and logical drives needed to provide a purpose-specific section to each one of the basic elements for equipment operation, operating system, dynamic files, applications, and user's files. Since available space exists in the disk, an additional set of purpose-specific sections is also created. The paragraph beginning on page 33, line 12, please make The following changes:

Creating the Basic Set in the Hard Drive

It is important to make clear that all logical drives established within the basic set of purpose-specific sections will employ the FAT 32 file system. Said basic set is prepared as follows:

a) A primary partition is created, and is set as the active partition, whose size is close to 512 MB. Occupying 100% of this partition's storage capacity, Drive "C" is created. This section will hold all the files that are part of the operating system.

b) Within an extended partition, that will occupy the remaining available space in the hard disk, Drive "D" is created. Its size must be just above 512 MB All those dynamic files used by the operating system and applications, whose relocation is possible, will be stored in this drive.

e) Within the above mentioned extended partition, Drive "E" is created. Its size must be close to 2,048 MB. This section will contain the files that are part of software applications.

d) Within the same extended partition, Drive "F" is created. Its size must be close to 700 MB. The files generated by the user will be stored in this drive.

Creating the Additional Set in the Hard Drive

It is important to emphasize that all logical drives set up within the additional set of purpose-specific sections will use the FAT 32 file system, and will be located within the aforesaid extended partition. This additional set is planned as follows:

a) Drive "G" is created with a size close to 700 MB. Its purpose will be to store files downloaded from the Internet.

b) Of equal size, Drive "H" is created, a buffer for writing compact disks.

c) With approximately 700 MB for each one, Drive "I" and Drive "J" are created, two repositories that will be used for back-up copies.

d) In the same way, drives "K" and "L" are also created, two storage areas for scanned images and music, respectively.

e) With remaining space available, Drive "M" is created, a multi-use extra area.

Formatting the Hard Disk

All logical drives created in the basic set of purpose-specific sections as well as in the additional set are formatted.

Step 3. Consideration of Cases with More than One Operating System

The third step is skipped because it is not necessary to have more than one operating system installed.

2$^{nd}$ STAGE. Installing and Configuring the Operating System

Step 1. Installing the Operating System

By means of the Microsoft® Windows® 98 Second Edition installation disk, the operating system is installed in Drive "C". Installation options must allow the user to perform all required activities. In this example, Internet access is needed by means of an external modem, which demands for all components of the Dial-up Network access and the TCP/IP protocol to be installed.

Step 2. Installing and Configuring Device Drivers

The second step consists of installing and configuring hardware devices required by The user, one by one, by "Installing a hardware device and its drivers" and by "Configuring a hardware device and its drivers", as explained below, for each and every one of the existing devices. In compliance with the assumptions presented at the beginning of this embodiment, which detailed the devices to be used, the CD-RW drive will be installed first; after That, the sound card; next, The modem; then, a printer; and last of all, The scanner.

Installing a Hardware Device and its Drivers

Using the corresponding installation disks, drivers for one hardware device are installed on the computer. It is important to emphasize that, in this step, only the drivers must be installed; bundled applications are left until the next stage. If said applications are automatically installed, however, and the installation program allows to set the path where its files will be stored, then an existing folder for this purpose must be set within "E:\Program Files", achieving in this way that these files remain within Drive "E".

Configuring a Hardware Device and its Drivers

It is wise to perform configurations as well as vital tests of the installed hardware device and its drivers, in a way that such device is ready to be used by the user.

Internet Access Configuration and Tests a) Needed configurations are set meeting all the specifications defined by the Internet Service Provider chosen by the user.

b) All required connection tests are performed in such a way that Internet access is ready for the user.

Step 3. Installing Operating System Supplements

Installing Updates and Patches for the Operating System

Using the tool for updates and patches included in the Microsoft® Windows® 98 Second Edition operating system, which requires access to the Internet, or by means of the corresponding disk, said elements are installed in Drive "C".

Installing Updates and Patches for Drivers
   By means of the tool for updates and patches in the Microsoft® Windows® 98 Second Edition operating system, which requires access to the Internet, or by means of the corresponding disk, said elements are installed in Drive "C".

Installing Add-ons for the Operating System
   Since there is a close relation between the Microsoft® Windows® 98 operating system and the Microsoft® Internet Explorer program, at this point is advisable, though strictly optional, to install a recent version of this program. Using the disk containing add-ons for the Microsoft® Windows® 98 Second Edition operating system, Microsoft® Internet Explorer is installed in Drive "E" as well as all of its components.

Installing Updates and Patches for Add-ons
   If updates and patches for the recently installed add-ons are needed or available, by means of the tool for updates and patches in the Microsoft® Windows® 98 Second Edition operating system, which requires access to the Internet, or by means of the corresponding disk, said elements are installed in the computer.

Step 4. Configuring the Operating System and its Add-ons

Configuring the Operating System
   a) The operating system's virtual memory is configured in such a way that its swap file resides in Drive "D".
   b) The "Cookies", "History", "Start Menu", "Media", "Recent", "Tasks", and "Temp" folders, located within "C:\Windows", are transferred into Drive "D". This move requires modifying the Windows Registry and initialization files in such a way that all reference to such folders now starts with "D:\".
   c) The values in "CommonFilesDir", "ProgramFilesDir" and "ProgramFilesPath", which are located in the path "HKLM>Software>Microsoft>Windows>Current Version" within the Windows Registry, must be modified in such a way that its contents start with "E:\".
   d) The "Application Data", "Desktop", and "Offline Web Pages" folders, located in "C:\Windows", are transferred into Drive "F". This move requires modifying the Windows Registry and the initialization files in such a way that all reference to such folders now starts with "F:\".
   e) The "C:\My documents" folder is transferred into Drive "F". This change also requires modifying the Windows Registry and initialization files in such a way that all reference to such folder now starts with "F:\".

Configuring the Operating System's Add-ons
   a) The "Temporary Internet Files" folder, located in "C:\Windows", is transferred into Drive "D". Needed adjustments in the Windows Registry must be done in such a way that all reference to such folder now starts with "D:\".
   b) The "Favorites" folder, located within "C:\Windows", is transferred into Drive "F". In like manner, necessary adjustments in the Windows Registry must be done in such a way that all reference to such folder now starts with "F:\".

Step 5. Relocating Applications Detached from the Operating System
   The "C:\Program Files" folder is transferred into Drive "E". All needed changes in the Windows Registry, initialization files, and all shortcuts must be done in such a way that every reference to such folder now starts with "E:\".

Step 6. Consideration of Cases with More than One Operating System
   The sixth step is skipped since there is no need to install an additional operating system.

3$^{rd}$ STAGE. Installing and Configuring Applications
   It is important to keep in mind that the first three steps of this stage focus only in one application. For such reason, all applications deemed suitable for installation must be exposed to the following three steps, one at a time, until they have all been installed:

Step 1. Installing One Application and its Supplements

Installing One Application
   With the corresponding installation disks, installing an application takes place at this moment. When the installation program allows setting the path where its files will be located, a folder must be chosen for such purpose within the "E:\Program Files" folder, achieving in this way that all files are installed within Drive "E".

Installing Updates and Patches for an Application
   Using the disk containing the matching updates and patches for the application at issue, installing those elements takes place at this moment, making sure that its files get installed in Drive "E".

Installing Add-ons for an Application
   With the disk containing the corresponding add-ons for the application at issue, installing those elements takes place at this moment, making sure that its files get installed in Drive "E".

Step 2. Configuring One Application and its Add-ons

Configuring One Application
   a) If the application offers a way to do it, needed adjustments are made so that the application's dynamic files, as logs for errors and for events, are stored in Drive "D". Among said adjustments are those that must be done in the Windows Registry and in those initialization files that refer to such elements, in such a way that all reference to said dynamic files now starts with "D:\".
   b) Installing the application at issue opens a possibility for unwanted changes in Windows Registry values such as "CommonFilesDir", "ProgramFilesDir" and "ProgramFilesPath", all located in the path "HKLM>Software>Microsoft>Windows>Current Version". If this is so, these values should be modified in such a way that their contents start again with "E:\".
   c) If the application offers a way to do it, needed adjustments are made so that it refers to the "F:\My documents" folder, or any other folder within Drive "F", in such a way that, when the user wishes to save his/her work, resulting files are stored by default in this drive. Among said changes are those that must be made in the Windows Registry and in initialization files in order to make all reference to this folder start with "F:\". Examples that may better illustrate this, include, but are not limited to, the following situation. If an e-mail application offers a way to configure the physical location of those files where messages and contacts are stored, then such configurations must be made in a way that all related files are stored within Drive "F".
   d) If the application offers a way to do it, necessary adjustments are made so that this application can recognize and employ the purpose-specific sections created in the additional set. Among said adjustments are those that must be made in the Windows Registry and in initialization files in order to update all references to these sections. Examples that may better illustrate this, include, but are not limited to, the following. (1) If the application for making CD-R or CD-RW recordings has the possibility to configure the location of its buffer, said parameter is adjusted in such a way that Drive "H" can be used for such purpose. (2) Another example would be to configure the applications that use the image scanner in a way that they employ Drive "K", whose purpose is a repository for scanned digital images.

Configuring Add-ons for One Application a) With the application's add-ons that allow doing so, needed adjustments are made so its dynamic files are stored in Drive "D". Among said changes are those that must be made in the Windows Registry and in initialization files, in a way that all reference to such dynamic files now starts with "D:\".

b) With the application's add-ons that allow doing so, needed adjustments are carried out so that these add-ons refer to the "F:\My documents" folder when the user wishes to save his/her work; these changes allows to keep the user's data files in Drive "F". Among said adjustments are those that must be made in the Windows Registry and in initialization files in a way that all reference to this folder now start with "F:\".

c) With the application's add-ons that allow doing so, needed adjustments are carried out so that these add-ons are able to recognize and use the purpose-specific sections created in the additional set. If needed, adjustments are also made in the Windows Registry and in the initialization files in order to update all references to said sections. Examples of this include, but are not limited to, the following situation. Add-ons that use the image scanner are configured in a way that they can take advantage of Drive "K", a storage area for scanned images.

Step 3. Relocating Files Detached from the Operating System

In case that the installation program of the application at issue deposits files in the path "C:\Program Files", the contents of any existing folders are transferred into "E:\Program Files". Certainly, required adjustments in the Windows Registry, initialization files, and all shortcuts must be done in such a way that references to such folders now start with "E:\".

Step 4. Consideration of Cases with More than One Operating System

The fourth step is skipped since there is no need to install an additional operating system.

4$^{th}$ STAGE. Restoring the User's Files

This stage is skipped because it is a new computer with no user's files.

5$^{th}$ STAGE. The Optimized Defragmentation of Files

In this stage, The optimized defragmentation process is performed in every drive. In order to get beller results, a specialized defragmenting tool and different file placement schemes, the most suitable for each drive, suggested.

It is important to emphasize that the preferred embodiment shown above is only an example and it does not limit the first component of the invention to be applied only under analogous circumstances. This means that those adaptations and considerations that must be done to apply the present invention—or any of its components—in other contexts will be evident for experts in the subject matter, as long as such circumstances are comprised within this invention's reach.

The invention claimed is:

1. A computer performance optimization method, the method comprising the following steps when applied to one computer:

A) preparing a main non-volatile storage medium of said one computer in such a way that it contains a basic set of four purpose-specific sections that include (i) a purpose-specific section to store files installed when setting up an operating system for said one computer; (ii) a purpose-specific section to store dynamic files of temporary character or that are regularly modified by software chores; (iii) a purpose-specific section to store files installed when setting up applications; and (iv) a purpose-specific section to store user related files;

B) installing software elements, comprising an operating system, hardware device drivers, and related up-dates, patches and add-ons that contribute to optimal equipment operation, furthermore, fine-tuning said software elements by configuring settings and by relocating files in order to establish properties on said software elements, including: (i) installed files residing in the suitable purpose-specific sections; (ii) said software elements identifying and using, by default, the purpose-specific sections related to them; and (iii) said software elements are separated at a physical and at a logical level;

C) installing software elements, comprising: applications and associated up-dates, patches and add-ons that contribute to optimal equipment operation, additionally, fine-tuning said software elements by configuring settings and by relocating files in order to bring about properties of said software elements, including: (i) installed files residing in the appropriate purpose-specific sections; (ii) said software elements acknowledging and using, by default, the purpose-specific sections related to them; and (iii) said software elements are separated at a physical and at a logical level; and D) defragmenting files in each of the purpose-specific sections within the basic set.

2. The method of claim 1, wherein in case the computer being optimized requires more than one operating system optimized by said method, steps A), B), C) and D) are repeated for each additional operating systems installed, in such a way that each one of said operating systems has its own basic set of purpose-specific sections.

3. The method of claim 1, wherein said step A) of preparing the main non-volatile storage medium, further comprises generating backup copies of existing user related files as well as existing hardware device drivers, prior to the preparation of the main non-volatile storage medium.

4. The method of claim 1, wherein the method further comprises an additional step for restoring backup copies of user related files into the corresponding user related purpose-specific sections, said restoring step is completed (i) by storing said user related files into the folders, directories, or locations that were configured in step B) of installing the operating system, and in step C) of installing the applications; and (ii) by completing such restoration prior to the execution of step D) of defragmenting files.

5. The method of claim 4, wherein the method further comprises, after the additional step for restoring the backup copies of user related files, (i) fine-tuning the operating system and applications by configuring its settings and by relocating misplaced files; as well as (ii) converting (changing the fonnat of) restored files; in order to let the user employ his/her files.

6. The method of claim 1, wherein said step A) of preparing the main non-volatile storage medium, further comprises creating an additional set of purpose-specific sections wherein those elements unrelated to system operation will reside in one or more purpose-specific sections, separated at a physical level and at a logical level.

7. The method of claim 1, wherein said step B) of installing the operating system, hardware device drivers, and associated up-dates, patches and add-ons, further comprises selecting options and adjusting parameters during the installation process of said software elements, in such a way that each one of its installation programs (i) stores installed files in the appropriate purpose-specific sections; and (ii) prepares said software elements to use and acknowledge purpose-specific sections contained within the basic set or, if available, purpose-specific sections contained within the additional set.

8. The method of claim 1, wherein said step C) of installing applications and related up-dates, patches and add-ons, further includes selecting options and adjusting parameters during the installation process of said software elements, in such a way that each one of its installation programs (i) stores installed files in proper purpose-specific sections; and (ii) prepares said software elements to identify and employ purpose-specific sections contained within the basic set or, if available, purpose-specific sections contained within the additional set.

9. The method of claim 1, wherein said step D) of defragmenting files, additionally comprises performing said task for sections in the additional set of purpose-specific sections.

10. The method of claim 1, wherein said step D) of defragmenting files, in order to optimize The physical location of files, includes the use of a defragmenting software tool that is capable of employing a different file placement scheme on each purpose-specific section being defragmented.

11. The method of claim 1, where said method is applied (i) to optimize computers or similar electronic devices, of different types or platforms; (ii) on different kinds of devices or storage technologies that can be used as a main non-volatile storage medium; (iii) different operating systems or applications.

12. A supplementary method to quickly optimize an unlimited number of identical computers once the computer performance optimization method of claim 1 has been used to optimize one "master" computer, the supplementary method comprises the following steps in order to replicate the state of said "master" computer onto many other "replica" computers:

A) optimizing one "master" computer by means of applying a computer performance optimization method on said "master" computer;

B) optimizing one or more "replica" computers by means of using software tools, storage units, network servers or deployment technologies, separately or combined, in order to quickly replicate the state of said "master" computer in all "replica" computers, said replication of said "master" computer resulting in an exact copy of the structure of existing purpose-specific sections and files within the main non-volatile storage medium in said "master" computer that is reproduced in the matching medium of each and every one of said "replica" computers.

13. The method of claim 12, wherein the method further includes the following step:

C) adjusting software configuration parameters in the optimized computers ("master" and ("replica" computers) in order to differentiate some of the optimized computers from others under different circumstances.

14. The method of claim 12, wherein the method further includes the following step:

D) installing additional applications and associated up-dates, patches and add-ons in the optimized computers ("master" and "replica" computers), as in step C) of the previously described computer performance optimization method, in order to fulfill the needs of specific user groups.

15. The method of claim 12, where said method is applied (i) to optimize computers or similar electronic devices, of different types or platforms; (ii) on different kinds of devices or storage technologies that can be used as a main non-volatile storage medium; (iii) with different operating systems or applications.

* * * * *